United States Patent
Bilski et al.

(10) Patent No.: US 10,990,552 B1
(45) Date of Patent: Apr. 27, 2021

(54) STREAMING INTERCONNECT ARCHITECTURE FOR DATA PROCESSING ENGINE ARRAY

(71) Applicant: Xilinx, Inc., San Jose, CA (US)

(72) Inventors: Goran Hk Bilski, Molndal (SE); Peter McColgan, Dublin (IE); Juan J. Noguera Serra, San Jose, CA (US); Baris Ozgul, Dublin (IE); Jan Langer, Chemnitz (DE); Richard L. Walke, Edinburgh (GB); Ralph D. Wittig, Menlo Park, CA (US); Kornelis A. Vissers, Sunnyvale, CA (US); Philip B. James-Roxby, Longmont, CO (US); Christopher H. Dick, San Jose, CA (US)

(73) Assignee: XILINX, INC., San Jose, CA (US)

( * ) Notice: Subject to any disclaimer, the term of this patent is extended or adjusted under 35 U.S.C. 154(b) by 26 days.

(21) Appl. No.: 15/944,464

(22) Filed: Apr. 3, 2018

(51) Int. Cl.
*G06F 13/40* (2006.01)
*G06F 13/42* (2006.01)

(52) U.S. Cl.
CPC ........ *G06F 13/4022* (2013.01); *G06F 13/404* (2013.01); *G06F 13/4282* (2013.01); *G06F 2213/0038* (2013.01)

(58) Field of Classification Search
None
See application file for complete search history.

(56) References Cited

U.S. PATENT DOCUMENTS

| | | | |
|---|---|---|---|
| 3,776,137 A | | 12/1973 | Abbott |
| 5,590,345 A | * | 12/1996 | Barker ............... G06F 7/483 |
| | | | 712/11 |
| 5,963,745 A | * | 10/1999 | Collins ............. G06F 9/3834 |
| | | | 712/13 |
| 5,963,746 A | * | 10/1999 | Barker ............. G06F 15/8007 |
| | | | 709/238 |
| 6,091,263 A | | 7/2000 | New et al. |
| 6,150,839 A | | 11/2000 | New et al. |
| 6,204,687 B1 | | 3/2001 | Schultz et al. |
| 6,462,579 B1 | | 10/2002 | Camilleri et al. |
| 6,526,557 B1 | | 2/2003 | Young et al. |

(Continued)

OTHER PUBLICATIONS

Mellanox, "BlueField Multicore System on Chip," copyright 2017, 4 pp., Mellanox Technologies, Sunnyvale, California, USA.

(Continued)

*Primary Examiner* — Henry Tsai
*Assistant Examiner* — Christopher A Bartels
(74) *Attorney, Agent, or Firm* — Patterson + Sheridan, LLP

(57) ABSTRACT

Examples herein describe techniques for communicating between data processing engines in an array of data processing engines. In one embodiment, the array is a 2D array where each of the DPEs includes one or more cores. In addition to the cores, the data processing engines can include a memory module (with memory banks for storing data) and an interconnect which provides connectivity between the engines. To transmit processed data, a data processing engine identifies a destination processing engine in the array. Once identified, the data processing engine can transmit the processed data using a reserved point-to-point communication path in the interconnect that couples the source and destination data processing engines.

20 Claims, 11 Drawing Sheets

(56) References Cited

U.S. PATENT DOCUMENTS

| | | |
|---|---|---|
| 6,759,869 B1 | 7/2004 | Young et al. |
| 6,810,514 B1 | 10/2004 | Alfke et al. |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,124,338 B1 | 10/2006 | Mark et al. |
| 7,224,184 B1 | 5/2007 | Levi et al. |
| 7,302,625 B1 | 11/2007 | Payakapan et al. |
| 7,477,072 B1 | 1/2009 | Kao et al. |
| 7,478,357 B1 | 1/2009 | Mason et al. |
| 7,482,836 B2 | 1/2009 | Levi et al. |
| 7,509,617 B1 | 3/2009 | Young |
| 7,518,396 B1 | 4/2009 | Kondapalli et al. |
| 7,546,572 B1 | 6/2009 | Ballagh et al. |
| 7,619,442 B1 | 11/2009 | Mason et al. |
| 7,640,527 B1 | 12/2009 | Dorairaj et al. |
| 7,724,815 B1 | 5/2010 | Raha et al. |
| 7,746,099 B1 | 6/2010 | Chan et al. |
| 8,102,188 B1 | 1/2012 | Chan et al. |
| 8,250,342 B1 | 8/2012 | Kostarnov et al. |
| 8,359,448 B1 | 1/2013 | Neuendorffer |
| 8,415,974 B1 | 4/2013 | Lysaght |
| 8,719,750 B1 | 5/2014 | Balzli, Jr. |
| 8,796,539 B2 | 8/2014 | Asaumi et al. |
| 8,928,351 B1 | 1/2015 | Konduru |
| 9,081,634 B1 | 7/2015 | Simkins et al. |
| 9,647,667 B1 * | 5/2017 | Perry ............... H03K 19/17728 |
| 9,722,613 B1 | 8/2017 | Schultz et al. |
| 2012/0185706 A1 * | 7/2012 | Sistla ................... G06F 1/3203 |
| | | 713/300 |
| 2015/0109024 A1 * | 4/2015 | Abdelfattah ........ G06F 17/5054 |
| | | 326/41 |
| 2016/0284046 A1 * | 9/2016 | Koker .................... G06T 15/80 |
| 2018/0293102 A1 * | 10/2018 | Ray ........................ G06T 1/20 |

OTHER PUBLICATIONS

Mellanox, "NP-5 Network Processor," copyright 2107, 2 pp., Mellanox Technologies, Sunnyvale, California, USA.

Mellanox, "Tile-Gx672 Processor," PB041, Feb. 14, 2015, 2 pp., Mellanox Technologies, Sunnyvale, California, USA.

Kalray, "Kalray NVMe-oF Target Controller Solutions," Dec. 18, 2017, 14 pp., Kalray Inc., Los Altos, California, USA.

EZchip, "Tile-Gx72 Processor," PB041, Feb. 14, 2015, 2 pp., EZchip Semiconductor, Inc., San Jose, California, USA.

Schooler, Richard, "Tile Processors: Many-Core for Embedded and Cloud Computing," Sep. 15, 2010, 35 pp., 14th Annual Workshop on High Performance Embedded Computing (HPEC '10).

Doud, Bob, "Accelerating the Data Plane with the Tile-Mx Manycore Processor," Feb. 25, 2015, 19 pp., Linley Data Center Conference, EZchip Semiconductor, Inc., San Jose, California, USA.

Wentzlaff, David et al., "On-Chip Interconnection Architecture of the Tile Processor," IEEE Micro, Nov. 12, 2007, pp. 15-31, vol. 27, Issue 5, IEEE Computer Society Press, Los Alamitos, California, USA.

Kalray, "MPPA Processors for Autonomous Driving," May 25, 2017, 18 pp., Kalray Inc., Los Altos, California, USA.

Kalray, "Deep Learning for High-Performance Embedded Applications," 19 pp., Kalray Inc., Los Altos, California, USA.

Xilinx, UltraScale Architecture DSP Slice, UG579, Oct. 18, 2017, 74 pp., Xilinx, Inc., San Jose, California, USA.

* cited by examiner

FIG. 10

HEADER FORMAT 1000

| BITS | FIELD |
|---|---|
| X-0 | STREAM ID |
| Y-X+1 | PACKET TYPE |
| Z-Y+1 | SOURCE ROW |
| A-Z+1 | SOURCE COLUMN |
| B-A+1 | PARITY BIT |

CHART 1005

1105 — IDENTIFY AN ARBITER USING THE PACKET HEADER IN THE STREAM

1110 — SELECT A MASTER SELECT VALUE

1115 — IDENTIFY THE ARBITERS CORRESPONDING TO THE SELECTED MASTER PORTS

1120 — IDENTIFY A MASKING VALUE

1125 — REMOVE THE HEADER FROM THE PACKET BEFORE TRANSMITTING THE PACKET

STREAMING INTERCONNECT ARCHITECTURE FOR DATA PROCESSING ENGINE ARRAY

TECHNICAL FIELD

Examples of the present disclosure generally relate to communicating between data processing engines (DPEs) in an array of engines.

BACKGROUND

A processor, a system on a chip (SoC), and an application specific integrated circuit (ASIC) can include multiple cores for performing compute operations such as processing digital signals, performing cryptography, executing software applications, rendering graphics, and the like. In some examples, the cores may transmit data between each other when performing the compute operations.

SUMMARY

Techniques for transferring data between a first and second data processing engines are described. One example is a method that includes processing data in a first data processing engine in an array of data processing engines disposed in an integrated circuit where each of the data processing engines are coupled together using an interconnect, and where each of the data processing engines comprise at least one streaming interconnect configured to form the interconnect. The method includes identifying a second data processing engine of the data processing engines as a destination for the processed data and determining whether the second data processing engine neighbors the first data processing engine in the array and has a direct communication path to the first data processing engine. Upon determining the second data processing engine does not have a direct communication link to the first data processing engine, the method includes transmitting the processed data to the second data processing engine using a reserved point-to-point communication path through a plurality of the streaming interconnects in the interconnect. The point-to-point communication path couples the first data processing engine to the second data processing engine.

One example described herein is a SoC that includes a first data processing engine in an array of data processing engines, a second data processing engine in the array of data processing engines, and an interconnect communicatively coupling the first and second data processing engines where the interconnect comprises a streaming interconnect disposed in each of the data processing engines. The first data processing engine is configured to identify the second data processing engine as a destination for data processed by the first data processing engine, determine whether the second data processing engine neighbors the first data processing engine in the array and has a direct communication path to the first data processing engine, and, upon determining the second data processing engine does not have a direct communication link to the first data processing engine, transmit the processed data to the second data processing engine using a reserved point-to-point communication path in the interconnect where the point-to-point communication path couples the first data processing engine to the second data processing engine.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 10 illustrates a header format for a switched packet, according to an example.

FIG. 11 is a flowchart for routing data using packet switching, according to one example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
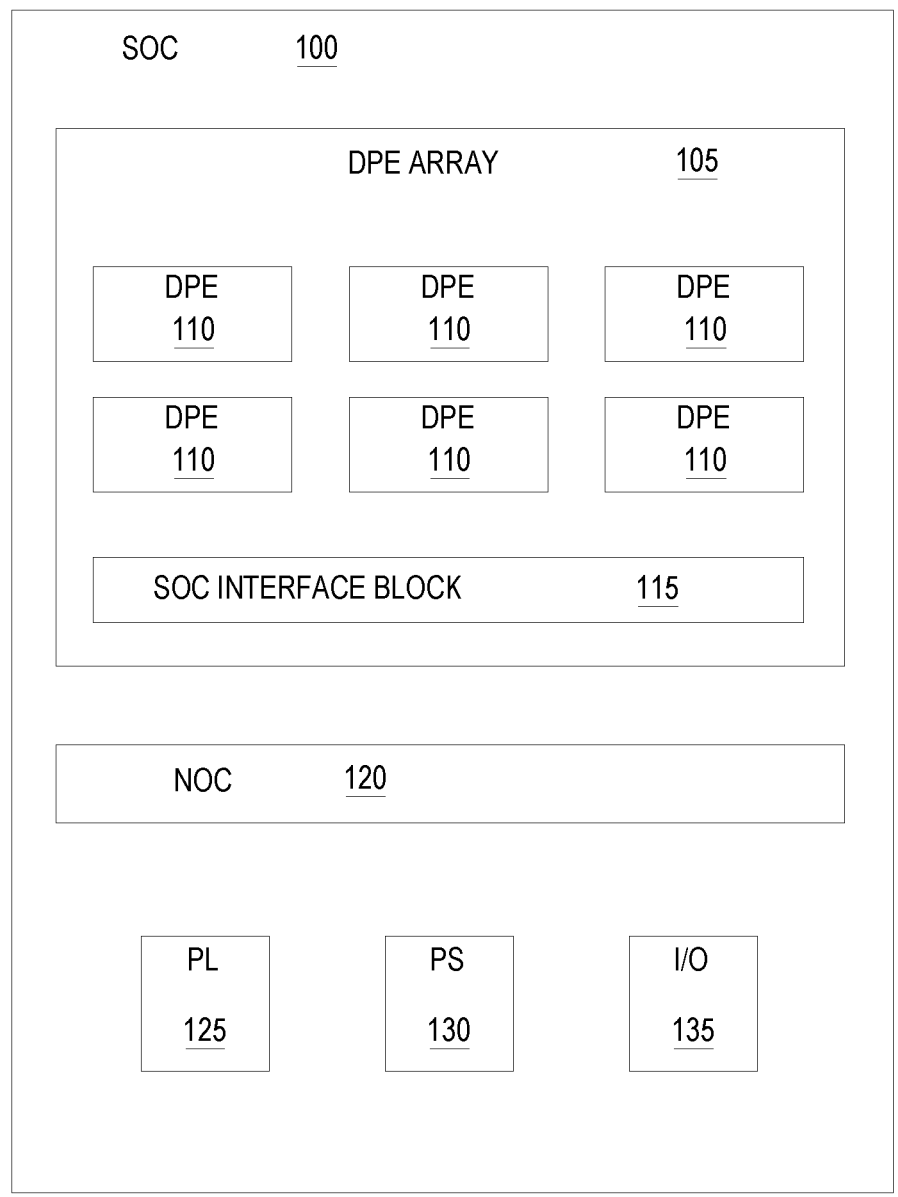
FIG. 1 is a block diagram of a SoC that includes a data processing engine array, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for communicating between data processing engines (DPEs) in an array of DPEs. In one embodiment, the array is a 2D array where each of the DPEs includes one or more cores. In addition to the cores, the DPEs can include a memory module (with memory banks for storing data) and an interconnect which provides connectivity between the DPEs.

In one embodiment, the DPEs include direct communication techniques for communicating between neighboring DPEs in the array. That is, instead of using the interconnects in the engines, two DPEs can communicate directly using the direct communication techniques such as shared memory or a core-to-core communication link. In one embodiment, the direct communication techniques may be available only for directly adjacent DPEs in the array. For example, a DPE may have a core-to-core communication link only between DPEs that are to the left and right (i.e., east and west) on the same row or up and down (i.e., north and south) on the same column. However, if the destination for the data is a non-neighboring DPE or the direct communication techniques are otherwise unavailable, the DPEs can you use the interconnects to communicate with any engine in the array.

In one embodiment, the interconnect transmits streaming data using two different modes: circuit switching and packet switching. Circuit switching establishes reserved point-to-point communication paths between endpoints in the interconnect which routes data in a deterministic manner. Packet switching, in contrast, transmits streaming data that includes headers for routing data within the interconnect in a non-deterministic manner. In one embodiment, the interconnect includes streaming interconnects that have ports that can be configured to perform circuit switching or packet switching. In one embodiment, the streaming interconnect can have one or more ports configured to perform circuit switching and one or more ports configured to perform packet switching.

FIG. 1 is a block diagram of a SoC 100 that includes a DPE array 105, according to an example. The DPE array 105 includes a plurality of DPEs 110 which may be arranged in a grid, cluster, or checkerboard pattern in the SoC 100. Although FIG. 1 illustrates arranging the DPEs 110 in a 2D array with rows and columns, the embodiments are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the embodiments herein are not limited to DPEs 110. Instead, the SoC 100 can include an array of any kind of processing elements, for example, the DPEs 110 could be digital signal processing engines, cryptographic engines, Forward Error Correction (FEC) engines, or other specialized hardware for performing one or more specialized tasks.

In FIG. 1, the array 105 includes DPEs 110 that are all the same type (e.g., a homogeneous array). However, in another embodiment, the array 105 may include different types of engines. For example, the array 105 may include digital signal processing engines, cryptographic engines, graphic processing engines, and the like. Regardless if the array 105 is homogenous or heterogeneous, the DPEs 110 can include direct connections between DPEs 110 which permit the DPEs 110 to transfer data directly as described in more detail below.

In one embodiment, the DPEs 110 are formed from non-programmable logic—i.e., are hardened. One advantage of doing so is that the DPEs 110 may take up less space in the SoC 100 relative to using programmable logic to form the hardware elements in the DPEs 110. That is, using hardened or non-programmable logic circuitry to form the hardware elements in the DPE 110 such as program memories, an instruction fetch/decode unit, fixed-point vector units, floating-point vector units, arithmetic logic units (ALUs), multiply accumulators (MAC), and the like can significantly reduce the footprint of the array 105 in the SoC 100. Although the DPEs 110 may be hardened, this does not mean the DPEs 110 are not programmable. That is, the DPEs 110 can be configured when the SoC 100 is powered on or rebooted to perform different functions or tasks.

The DPE array 105 also includes a SoC interface block 115 (also referred to as a shim) that serves as a communication interface between the DPEs 110 and other hardware components in the SoC 100. In this example, the SoC 100 includes a network on chip (NoC) 120 that is communicatively coupled to the SoC interface block 115. Although not shown, the NoC 120 may extend throughout the SoC 100 to permit the various components in the SoC 100 to communicate with each other. For example, in one physical implementation, the DPE array 105 may be disposed in an upper right portion of the integrated circuit forming the SoC 100. However, using the NoC 120, the array 105 can nonetheless communicate with, for example, programmable logic (PL) 125, a processor subsystem (PS) 130 or input/output (I/O) 135 which may disposed at different locations throughout the SoC 100.

In addition to providing an interface between the DPEs 110 and the NoC 120, the SoC interface block 115 may also provide a connection directly to a communication fabric in the PL 125. In one embodiment, the SoC interface block 115 includes separate hardware components for communicatively coupling the DPEs 110 to the NoC 120 and to the PL 125 that is disposed near the array 105 in the SoC 100. In one embodiment, the SoC interface block 115 can stream data directly to a fabric for the PL 125. For example, the PL 125 may include an FPGA fabric which the SoC interface block 115 can stream data into, and receive data from, without using the NoC 120. That is, the circuit switching and packet switching described herein can be used to communicatively couple the DPEs 110 to the SoC interface block 115 and also to the other hardware blocks in the SoC 100. In another example, SoC interface block 115 may be implemented in a different die than the DPEs 110. In yet another example, DPE array 105 and at least one subsystem may be implemented in a same die while other subsystems and/or other DPE arrays are implemented in other dies. Moreover, the streaming interconnect and routing described herein with respect to the DPEs 110 in the DPE array 105 can also apply to data routed through the SoC interface block 115.

Although FIG. 1 illustrates one block of PL 125, the SoC 100 may include multiple blocks of PL 125 (also referred to as configuration logic blocks) that can be disposed at different locations in the SoC 100. For example, the SoC 100 may include hardware elements that form a field programmable gate array (FPGA). However, in other embodiments, the SoC 100 may not include any PL 125—e.g., the SoC 100 is an ASIC.

Figure 2:
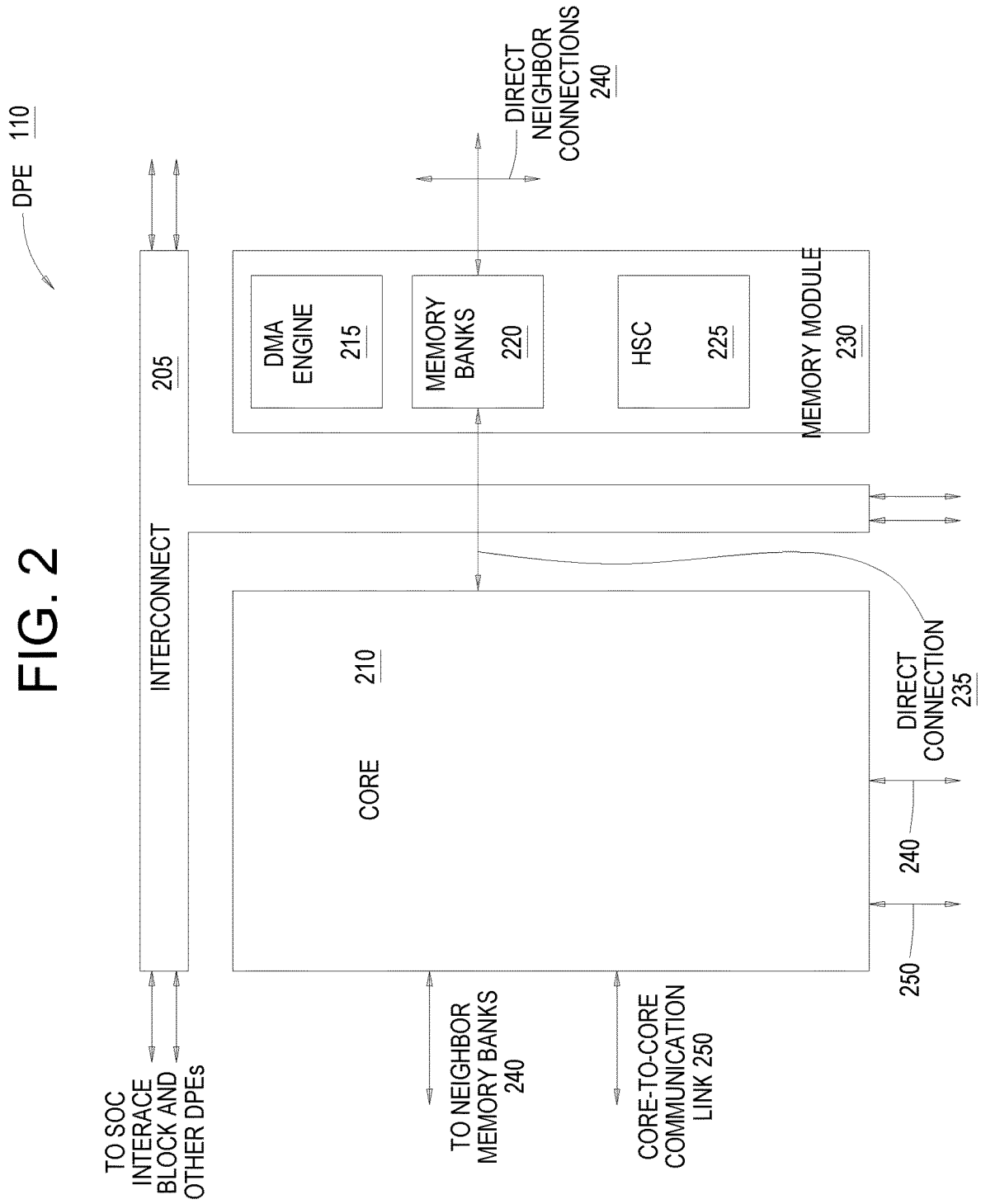
FIG. 2 is a block diagram of a data processing engine in the data processing engine array, according to an example.

FIG. 2 is a block diagram of a DPE 110 in the DPE array 105 illustrated in FIG. 1, according to an example. The DPE 110 includes an interconnect 205, a core 210, and a memory module 230. The interconnect 205 permits data to be transferred from the core 210 and the memory module 230 to different cores in the array 105. That is, the interconnect 205 in each of the DPEs 110 may be connected to each other so that data can be transferred north and south (e.g., up and down) as well as east and west (e.g., right and left) in the array of DPEs 110.

Referring back to FIG. 1, in one embodiment, the DPEs 110 in the upper row of the array 105 relies on the interconnects 205 in the DPEs 110 in the lower row to communicate with the SoC interface block 115. For example, to transmit data to the SoC interface block 115, a core 210 in a DPE 110 in the upper row transmits data to its interconnect 205 which is in turn communicatively coupled to the interconnect 205 in the DPE 110 in the lower row. The interconnect 205 in the lower row is connected to the SoC interface block 115. The process may be reversed where data intended for a DPE 110 in the upper row is first transmitted from the SoC interface block 115 to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the SoC interface block 115.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the streaming connections and streaming interconnects (not shown in FIG. 2) in the interconnect 205 may be configured to form routes from the core 210 and the memory module 230 to the neighboring DPEs 110 or the SoC interface block 115. Once configured, the core 210 and the memory module 230 can transmit and receive streaming data along those routes. In one embodiment, the interconnect 205 is configured using the Advanced Extensible Interface (AXI) 4 Streaming protocol.

In addition to forming a streaming network, the interconnect 205 may include a separate network for programming or configuring the hardware elements in the DPE 110. Although not shown, the interconnect 205 may include a memory mapped interconnect which includes different connections and switch elements used to set values of configuration registers in the DPE 110 that alter or set functions of the streaming network, the core 210, and the memory module 230.

In one embodiment, streaming interconnects (or network) in the interconnect 205 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 110 to one or more destination DPEs 110. In one embodiment, the point-to-point communication path used when performing circuit switching in the interconnect 205 is not shared with other streams (regardless whether those streams are circuit switched or packet switched). However, when transmitting streaming data between two or more DPEs 110 using packet-switching, the same physical wires can be shared with other logical streams. The differences between these two data routing schemes are discussed in more detail below.

The core 210 may include hardware elements for processing digital signals. For example, the core 210 may be used to process signals related to wireless communication, radar, vector operations, machine learning applications, and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the engine type. That is, the cores in a digital signal processing engine, cryptographic engine, or FEC may be different.

The memory module 230 includes a direct memory access (DMA) engine 215, memory banks 220, and hardware synchronization circuitry (HSC) 225 or other type of hardware synchronization block. In one embodiment, the DMA engine 215 enables data to be received by, and transmitted to, the interconnect 205. That is, the DMA engine 215 may be used to perform DMA reads and write to the memory banks 220 using data received via the interconnect 205 from the SoC interface block or other DPEs 110 in the array.

The memory banks 220 can include any number of physical memory elements (e.g., SRAM). For example, the memory module 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory module 230 which is in turn coupled to the memory banks 220.

In one embodiment, the memory module 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. The HSC 225 can be used to govern or protect access to the memory banks 220. In one embodiment, before the core 210 or a core in a neighboring DPE can read data from, or write data into, the memory banks 220, the HSC 225 provides a lock to an assigned portion of the memory banks 220 (referred to as a "buffer"). That is, when the core 210 wants to write data, the HSC 225 provides a lock to the core 210 which assigns a portion of a memory bank 220 (or multiple memory banks 220) to the core 210. Once the write is complete, the HSC 225 can release the lock which permits cores in neighboring DPEs to read the data.

Because the core 210 and the cores in neighboring DPEs 110 can directly access the memory module 230, the memory banks 220 can be considered as shared memory between the DPEs 110. That is, the neighboring DPEs can directly access the memory banks 220 in a similar way as the core 210 that is in the same DPE 110 as the memory banks 220. Thus, if the core 210 wants to transmit data to a core in a neighboring DPE, the core 210 can write the data into the memory bank 220. The neighboring DPE can then retrieve the data from the memory bank 220 and begin processing the data. In this manner, the cores in neighboring DPEs 110 can transfer data using the HSC 225 while avoiding the extra latency introduced when using the interconnects 205. In contrast, if the core 210 wants to transfer data to a non-neighboring DPE in the array (i.e., a DPE without a direct connection 240 to the memory module 230), the core 210 uses the interconnects 205 to route the data to the memory module of the target DPE which may take longer to complete because of the added latency of using the interconnect 205 and because the data is copied into the memory module of the target DPE rather than being read from a shared memory module.

In addition to sharing the memory modules 230, the core 210 can have a direct connection to cores 210 in neighboring DPEs 110 using a core-to-core communication link 250. That is, instead of using either a shared memory module 230 or the interconnect 205, the core 210 can transmit data to another core in the array directly without storing the data in a memory module 230 or using the interconnect 205 (which can have buffers or other queues). For example, communicating using the core-to-core communication links 250 may use less latency (or have high bandwidth) than transmitting data using the interconnect 205 or shared memory (which requires a core to write the data and then another core to read the data) which can offer more cost effective communication. In one embodiment, the core-to-core communication links 250 can transmit data between two cores 210 in one clock cycle. In one embodiment, the data is transmitted between the cores on the link 250 without being stored in any memory elements external to the cores 210. In one embodiment, the core 210 can transmit a data word or vector to a neighboring core using the links 250 every clock cycle, but this is not a requirement.

In one embodiment, the communication links 250 are streaming data links which permit the core 210 to stream data to a neighboring core. Further, the core 210 can include any number of communication links 250 which can extend to different cores in the array. In this example, the DPE 110 has respective core-to-core communication links 250 to cores located in DPEs in the array that are to the right and left (east and west) and up and down (north or south) of the core 210. However, in other embodiments, the core 210 in the DPE 110 illustrated in FIG. 2 may also have core-to-core communication links 250 to cores disposed at a diagonal from the core 210. Further, if the core 210 is disposed at a bottom periphery or edge of the array, the core may have core-to-core communication links to only the cores to the left, right, and bottom of the core 210.

However, using shared memory in the memory module 230 or the core-to-core communication links 250 may be available if the destination of the data generated by the core 210 is a neighboring core or DPE. For example, if the data is destined for a non-neighboring DPE (i.e., any DPE that DPE 110 does not have a direct neighboring connection 240 or a core-to-core communication link 250), the core 210 uses the interconnects 205 in the DPEs to route the data to the appropriate destination. As mentioned above, the interconnects 205 in the DPEs 110 may be configured when the SoC is being booted up to establish point-to-point streaming connections to non-neighboring DPEs to which the core 210 will transmit data during operation.

Figure 3:
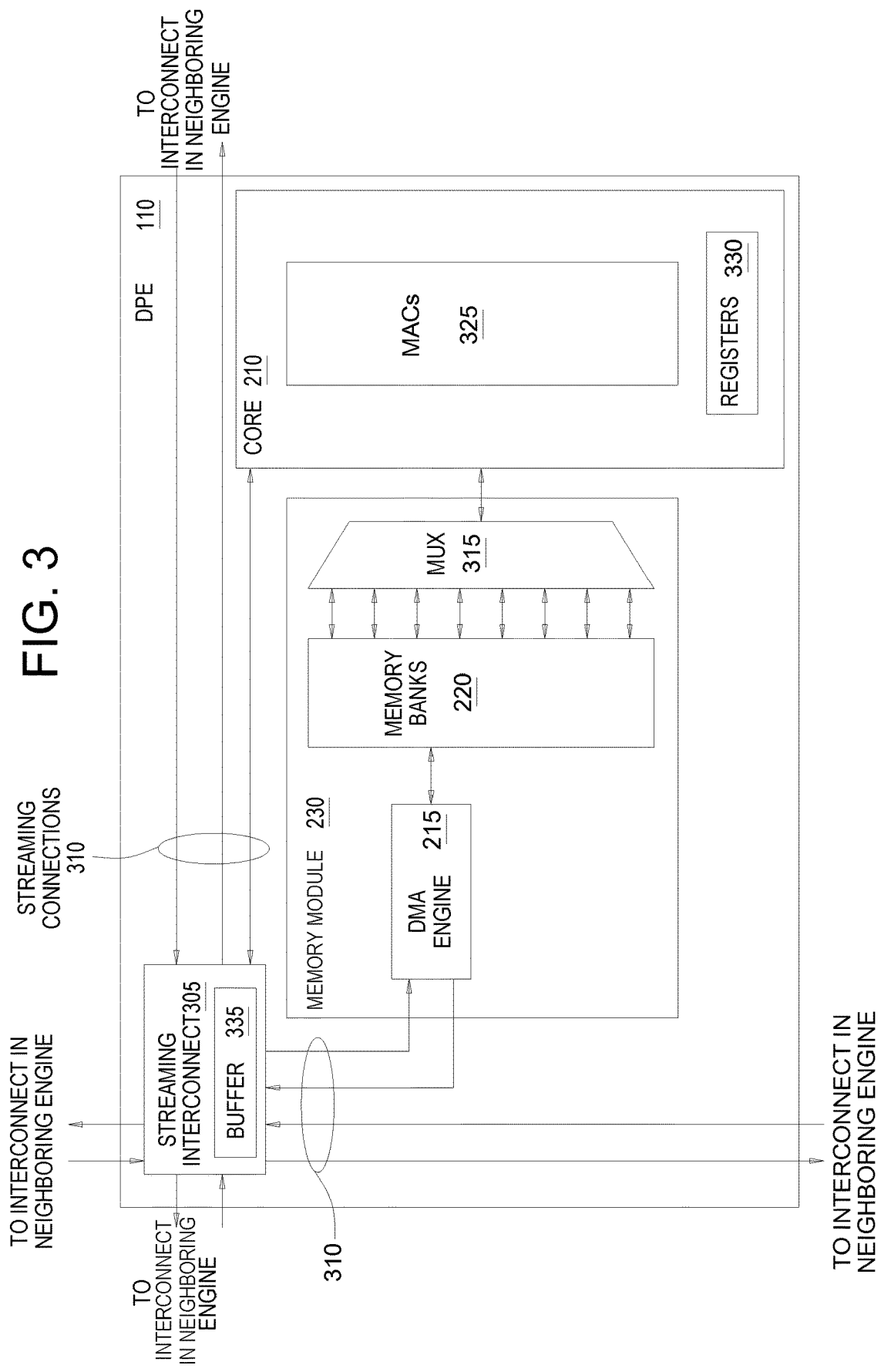
FIG. 3 is a block diagram of a data processing engine in the data processing engine array, according to an example.

FIG. 3 is a block diagram of the DPE 110 in the digital signal processing engine array, according to an example. Like in FIG. 2, the DPE 110 includes the core 210 and the memory module 230. However, FIG. 3 illustrates a streaming interconnect 305 and streaming connections 310 forming the interconnect 205 in the DPE 110. As shown, the streaming interconnect 305 uses the streaming connections 310 to connect two interconnects 205 in neighboring DPEs. That is, the streaming connections 310 in the DPE 110 are connected to streaming interconnects 305 in other DPEs in the array. In this example, the streaming interconnect 305 is connected to interconnects located in DPEs that are disposed to the east, west, south, and north in the array. Thus, the interconnect 205 can use the streaming connections 310 to forward data to streaming interconnects disposed in neighboring DPEs. Each of the streaming connections 310 can represent multiple parallel streaming interfaces or connections. For example, there could be W number of streaming connections 310 in the north/south direction, X number of streaming connections 310 in the east/west direction, Y number of connections 310 to the DMA engine 215, and Z number of connections 310 to the core 210, where W, X, Y, and Z can be the same number or different numbers.

In one embodiment, the data paths for the point-to-point communication paths are determined before data is transmitted (and are reserved) unlike in a data packet routing scheme where routing the data packets is fluid. In one embodiment, the streaming interconnects 305 and the streaming connections 310 can support both circuit switching and packet switching for routing data between the DPEs 110.

In one embodiment, the streaming interconnects 305 in the various DPEs form point-to-point communication paths between DPEs. For example, if the DPE 110 in FIG. 3 transmits data to a DPE that is the same row but two columns over to the left, when configuring the SoC, the streaming interconnect 305 in the DPE 110 as well as the streaming interconnects in the DPEs in the left two columns are programmed to provide a streaming connection between the DPE 110 and the destination DPE two columns over. Thus, when in operation, the point-to-point communication path has already been established using the streaming interconnects 305 and streaming connections 310 in the interconnects. Moreover, the point-to-point communication paths are reserved for the DPEs 110 that are one the ends of the path—i.e., the transmitting DPE and the destination DPE.

The DPE 110 can also use the streaming interconnect 305 to transmit event data to other DPEs 110 or the SoC interface block. The event data may be generated by the DPE 110 for debugging, tracing, and/or profiling the engine 110. The streaming interconnect 305 can transfer the event data (e.g., event tracing and execution tracing) to the SoC interface block which can in turn forward the event data to external agents such as the PL or PS in the SoC. In one embodiment, the DPE 110 converts the event data into streaming data so the event data can be transmitted across the interconnects.

The streaming interconnect 305 includes a buffer 335 (or FIFO) that can be used to handle jitter between sources and destinations. For example, if the DPE 110 is the destination, but the DMA engine 215 or the core 210 has temporally stalled thereby preventing the streaming interconnect 305 from forwarding data to engine 215 or the core 210. Instead of losing or dropping the data, the streaming interconnect 305 can store the streaming data in the buffer 335. Once the DMA engine 215 or the core 210 is resumed, the streaming interconnect 305 can forward the data from the buffer 335 to the engine 215 or the core 210. The buffer 335 can also be used if a downstream streaming interconnect cannot receive data. The streaming interconnect can temporarily store data in the buffer 335 until the downstream streaming interconnect is again available. Thus, the buffer 335 permits the streaming interconnect 305 to handle jitter between the streaming interconnect 305 and next hop in the point-to-point communication path.

Although FIG. 3 illustrates a single streaming interconnect 305, the engine 110 can include any number of switches. For example, the interconnect in the engine 110 can include a first streaming interconnect for communicating with neighboring DPEs to the east and north and a second streaming interconnect for communicating with neighboring DPEs to the west and south of the DPE 110 shown in FIG. 3. The first and second streaming interconnects can then be communicatively coupled to each other in the interconnect 205. Moreover, the streaming interconnect 305 can be coupled to more or fewer neighboring DPEs than shown. For example, the streaming interconnect 305 may be coupled to interconnects in DPEs that are located at a diagonal from the DPE 110 in the array.

In addition to being coupled to streaming interconnects in neighboring DPEs, the streaming interconnect 305 is coupled to the DMA engine 215 in the memory module 230. The DPE 110 can use the DMA engine 215 to transmit data to, or receive data from, the streaming interconnect 305. That is, the DMA engine 215 can perform DMA reads from the memory banks 220 which the DMA engine 215 forwards to the streaming interconnect 305. In turn, the streaming interconnect 305 forwards the data using a point-to-point communication path. When receiving data from the streaming interconnect 305, the DMA engine 215 performs a DMA write into the memory banks 220. That is, after receiving data intended for the DPE 110, the streaming interconnect 305 provides the data to the DMA engine 215 which stores the data in the memory banks 220.

The memory banks 220 are coupled to the core 210 by a multiplexer (MUX) 315. The MUX 315 permits the core 210 to read from, and store data into, the memory banks 220.

In one embodiment, the streaming interconnect 305 has a direct connection to the core 210. That is, in addition to routing data to the DMA engine 215 in the memory module 230, the streaming interconnect 305 may transmit data directly to the core 210 as well as receive data directly from the core 210. Put differently, the data does not have to be first stored in the memory module 230 before being transmitted to the core 210 or being transmitted from the core 210 to the streaming interconnect 305.

The core 210 also includes multiple accumulators (MACs) 325 for processing the data. In one embodiment, the MACs 325 perform a multiple accumulate operation that can be used in a digital signal processing, but the embodiments herein are not limited to such. For example, each of the MACs 325 can includes a multiplier that computes the product of two operands that is forwarded to a summer which sums the current output value of the multiplier to a previously stored output of the MAC 325. That is, the summer uses a feedback loop to add the previous output of the summer (which was stored in one of the registers 330) to the current output value of the multiplier. However, the core 210 can have different hardware elements depending on the type of data processing engine being implemented in the SoC. That is, a graphics engine may have different elements in the core 210 than the DPE 110.

Figure 4A:
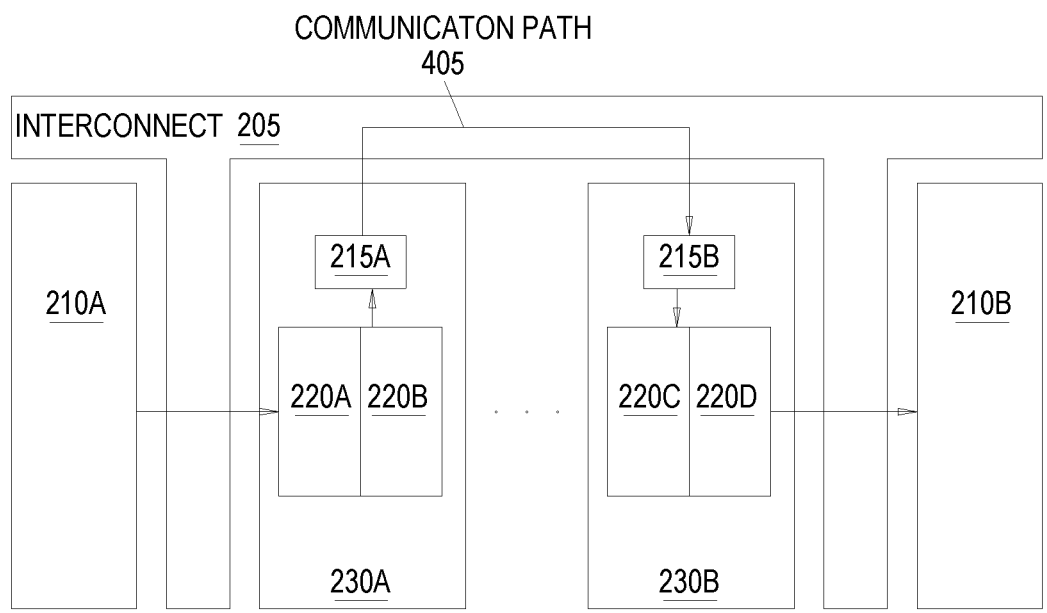
FIGS. 4A and 4B illustrate communicating between data processing engines using the interconnect and memory modules, according to an example.
Figure 4B:
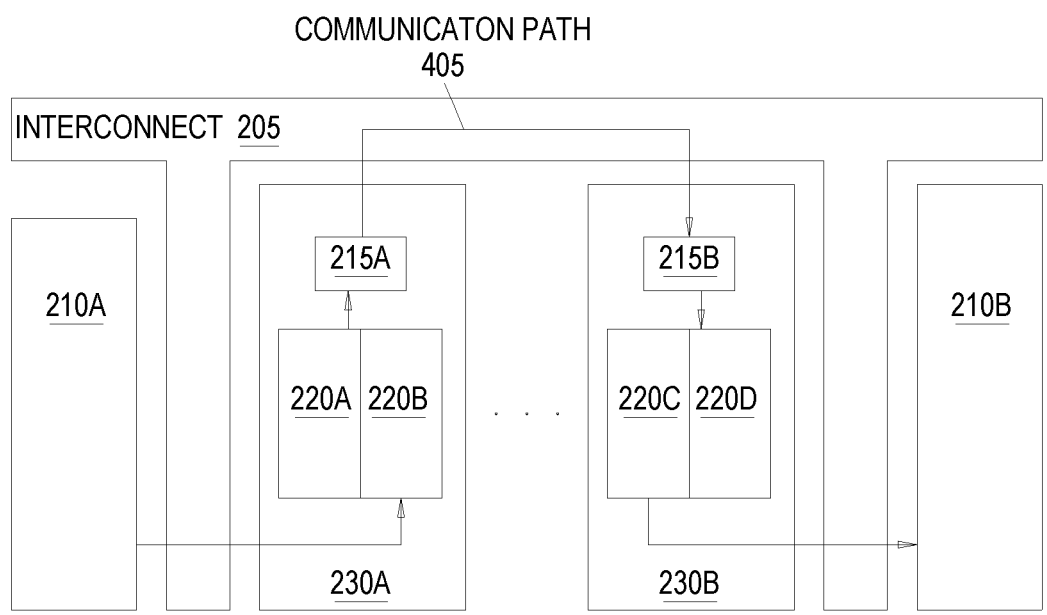

FIGS. 4A and 4B illustrate communicating between DPEs using the interconnect and memory modules, according to an example. FIG. 4A illustrates the core 210A transmitting data to the core 210B which are located in two different DPEs in the array. Although the cores 210A and 210B can be in neighboring or directly adjacent DPEs, the cores 210A and 210B are in non-neighboring DPEs that do not share memory or have a direct core-to-core communication link.

To transmit data to the core 210B, the core 210A first transmits data to the memory bank 220A in the memory module 230A. In one embodiment, the memory module 230A may be in the same DPE as the core 210A, but this is not a requirement. For example, the core 210A may have a direct neighbor connection to the memory module 230A which is in a different DPE.

While the core 210A writes data into the memory bank 220A, the DMA engine 215A is reading data from the memory bank 220B. That is, these two operations may be performed in parallel. Further, the DMA engine 215A can transmit data along a point-to-point communication path 405 in the interconnect 205 at the same time the DMA engine 215A reads data from the memory bank 220B. For example, the DMA engine 215A can transmit data on the communication path 405 that was read from the memory banks 220 in a previous read cycle. As such, the core 210A can transmit data to the memory bank 220A in parallel with the DMA engine 215A reading data from the memory bank 220B and in parallel with the DMA engine 215 transmitting data on the communication path 405.

Transmitting the data from the DMA engine 215A to the DMA engine 215B in the interconnect 205 can be performed using either circuit switching or packet switching. That is, the ports in the DPEs coupled to the interconnect 205 can use circuit switching or packet switching to transfer the data in the interconnect 205. Data can also be transmitted from the DMA engine 215 to a core 210 and directly between two cores 210 using either circuit switching or packet switching. This also applies for streaming connections to the SoC interface block.

Although FIG. 4A illustrates the interconnect 205 as one continuous interconnect 205, the interconnect 205 may include multiple streaming interconnects and traces which are disposed in multiple different DPEs. That is, the interconnect 205 may include multiple different portions disposed in multiple different DPEs that are used for the communication path 405. The hardware elements in the different portions (e.g., the streaming interconnects and the traces which are not shown) are coupled to form the continuous interconnect 205. As discussed above, the communication path 405 may be reserved for the cores 210A and 210B to transmit streaming data.

The communication path 405 terminates at the DMA engine 215B in the memory module 230B. In one embodiment, while receiving the data from the communication path 405, the DMA engine 215B transmits data to the memory bank 220C. The data transmitted from the engine 215B into the memory bank 220C may have been received previously from the communication path 405 and is now being stored in the memory bank 220C. At the same time, the core 210B can read data from the memory bank 220D. For example, the DMA engine 215B may have previously written data into the memory bank 220D which the core 210B now retrieves at the time illustrated in FIG. 4A.

FIG. 4B illustrates a time period after the time period illustrated in FIG. 4A. Instead of writing data into the memory bank 220A, the core 210A is now writing data into the memory bank 220B. For example, the core 210A may have filled an allocated portion of the memory bank 220A as shown by the time period in FIG. 4A and in FIG. 4B is now filling allocated memory in the memory bank 220B which was being read from by the DMA engine 215A in FIG. 4A. Thus, FIGS. 4A and 4B illustrate that when the core 210A is writing into one of the memory banks 220A and 220B, the DMA engine 215A can read from the other memory bank which stores data that was previously written by the core 210A. As such, the core 210A can be writing data into a memory bank 220 in parallel with the DMA engine 215A reading from the other memory bank 220 in the memory module 230A. Doing so may result in the DMA engine 215A transmitting a more steady stream of data along the communication path 405 than if the DMA engine 215A and the core 210A used only one memory bank 220 to write and read data.

In one embodiment, writing and reading into the memory banks 220 is synchronized. For example, the memory modules 230A and 230B may use locks which control access to memory buffers which might be stored in one or more of the memory banks 220 (not necessarily a full bank). That is, a lock is not necessarily associated with a particular memory bank, although it can be. For example, in FIG. 4B, the core 210A may have a lock for memory bank 220B which prevents the DMA engine 215A from accessing the memory bank 220B. Similarly, the DMA engine 215A has a lock for the memory bank 220A which prevents the core 210A from reading or writing data in that bank 220A.

In one embodiment, the core 210A and the DMA engine 215A may use three or more memory banks 220 to transfer data. For example, the memory banks 220 may form a FIFO where the core 210A can store data in any of the unused or empty memory banks 220 and the DMA engine 215A reads data from the portion of the FIFO with the oldest data. One advantage of using three or more memory banks 220 is it means the DMA engine 215A and core 210A can operate at different speeds without stalling. For example, if it takes more time for the core 210A to write data than for the DMA engine 215A to read data, then the DMA engine 215A stalls while waiting for the core 210A to complete its write operation. For example, the core 210A may write a particular large chunk of data into a memory bank 220 while the DMA engine 215A reads a smaller chunk of data. However, if the memory banks 220 establish a FIFO, there may be multiple memory banks 220 that store data that is ready to be read by the DMA engine 215A. Thus, the DMA engine 215A can go ahead and read data from another memory bank that stores data that was previously provided by the core 210A. In this manner, the DMA engine 215A and the core 210 can operate a different speeds (at least temporarily) without stalling assuming the FIFO is not full and it includes multiple memory banks that have data ready to be read by the DMA engine 215A. Thus, regardless if the DMA engine 215A temporarily reads data faster than the core 210A can write data, or the core 210A temporarily writes data faster than the DMA engine 215A reads data, the FIFO can enable the two operations to occur in parallel without stalling.

On the other end of the point-to-point communication path 405, the interconnect 205 transmits data to the DMA engine 215B that performs a DMA write to store the data in the memory bank 220D. In parallel, the core 210B can read data from the memory bank 220C which stores data that was previously written by the DMA engine 215B. In one embodiment, these two operations also occur in parallel with the write operation performed by the core 210A and the read operation performed by the DMA engine 215A. Of course, instead of using two memory banks 220 as shown, the DMA engine 215B and the core 210B can use a FIFO to transfer data which has more than two memory banks and thus can reduce the likelihood of a stall if the DMA engine 215B and the core 210B perform their respective operations at different speeds.

Figure 5:
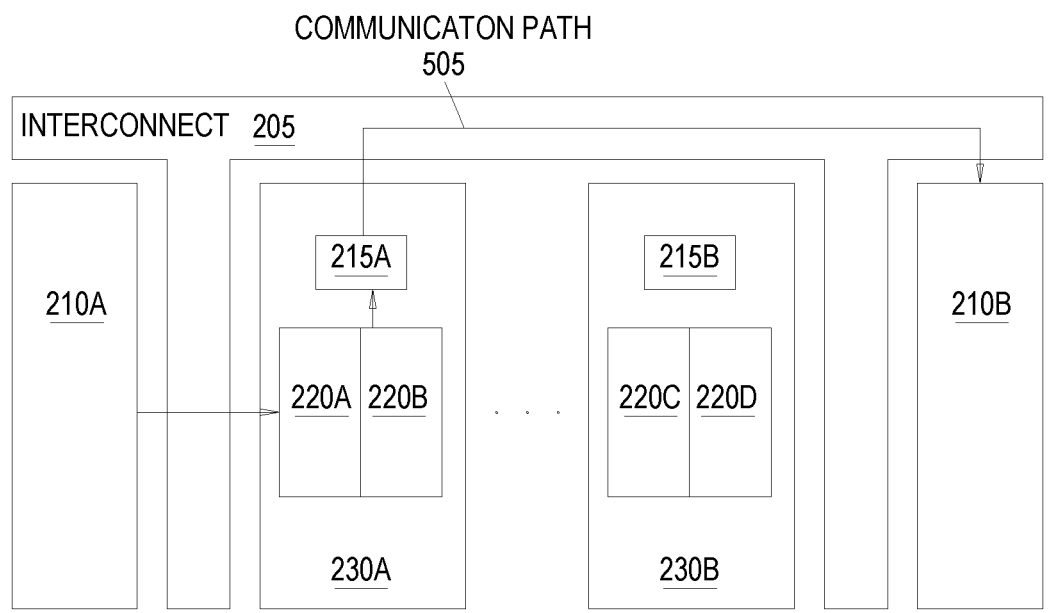
FIG. 5 illustrates communicating between data processing engines using the interconnect, according to an example.

FIG. 5 illustrates communicating between DPEs using the interconnect, according to an example. FIG. 5 illustrates a point-to-point communication path 505 in the interconnect 205 where the DMA engine 215A is at one end and the core 210B is at another. That is, FIG. 5 illustrates the same structure as shown in FIGS. 4A and 4B but that the communication path is between the memory module 230A and the core 210B rather than between two memory modules 230.

Using the communication path 505, the DMA engine 215A can forward data to the core 210B while bypassing the memory module 230A. That is, FIG. 5 illustrates an example where the interconnect 205 can communicate directly with the core 210B to send and receive data rather than using the memory module 230B as an intermediary.

Transmitting the data from the DMA engine 215A to the core 210B using the interconnect 205 as shown in FIG. 5 can be performed using circuit switching or packet switching. That is, the ports in the DPEs coupled to the interconnect 205 can use circuit switching or packet switching to transfer the data in the interconnect.

Figure 6:
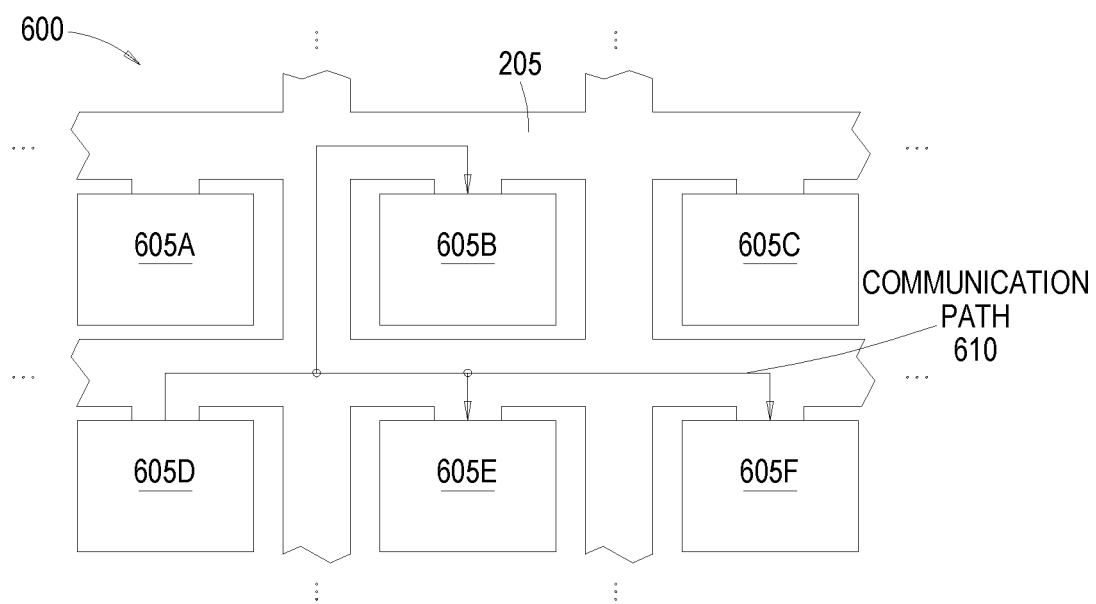
FIG. 6 illustrates broadcasting data to multiple data processing engines using an interconnect, according to an example.

FIG. 6 illustrates broadcasting data to multiple DPEs 605 using an interconnect 205, according to an example. The DPEs 605 can include a memory module and a core which transmit data to another DPE 605 in an array 600. That is, either the core or the memory module in the DPEs 605 can transmit data to the interconnect 205 which then routes the data to corresponding destinations using a communication path 610. In this embodiment, the communication path 610 has multiple destinations. That is, the communication path 610 multicasts data to cores or memory modules in multiple DPEs 605 rather than only one DPE like in FIGS. 4A-4B, and 5. In FIG. 6, the DPE 605D transmits data to the DPEs 605B, 605E, and 605F using the communication path 610. In other embodiments, there can be an arbitrary number of destination DPEs 605 for a multicast or broadcast stream.

The communication path 610 can be established using circuit switching or packet switching. Put differently, a single master (e.g., the DPE 605B) can use circuit switching or packet switching to transmit data to multiple servants or slaves (e.g., the DPEs 605B, 605E, and 605F). The details for performing these two types of routing are described below.

In one embodiment, the communication path 610 is a split operation where the incoming data provided by the DPE 605D is copied to all outgoing streams destined for the DPEs 605B, 605E, and 605F. That is, the communication path 610 can include multiple streams that have a common source (i.e., the DPE 605D) but different destinations. In one embodiment, if one of the destination DPEs 605B, 605E, and 605F is not ready for the data (i.e., there is backpressure), the DPE 605D may not transmit any data on any stream and wait until all the destinations are ready for the data. That is, the DPE 605D may transmit data along the communication path 610 but then pause or stop transmitting data if one of the destination DPEs is no longer able to receive the data.

If the communication path 610 is used to couple together cores in the DPEs 605B, 605E, and 605F, in one embodiment, locks are not used for synchronization as the cores will stall until the core in the DPE 605D transmits data along the communication path 610 or the cores in the DPE 605B, 605E, and 605F receive data from the communication path 610. That is, the data can be transmitted directly from the core in the DPE 605D to the cores in the DPEs 605B, 605E, and 605F without the data flowing through a DMA engine or memory banks in the memory modules.

Figure 7:
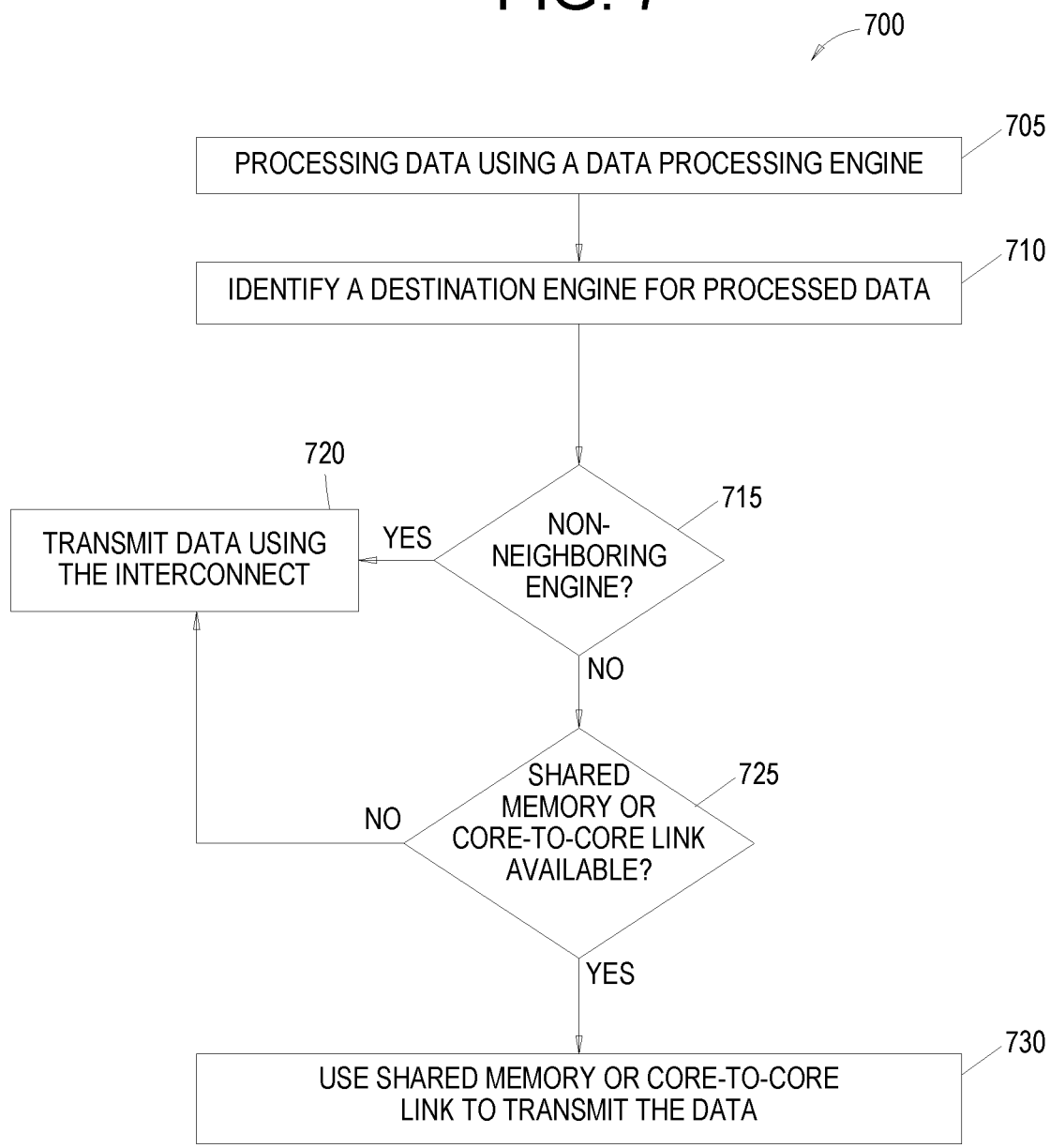
FIG. 7 is a flowchart for communicating between data processing engines, according to an example.

FIG. 7 is a flowchart of a method 700 for communicating between data processing engines, according to an example. At block 705, a data processing engine (e.g., a DPE) processes data that will be transmitted to another data processing engine in an array of data processing engines in a SoC. Although FIG. 7 discusses transmitting data using the interconnect between two DPEs, the embodiments herein are not limited to such and instead the interconnect (and the direct neighbor connections) can be used to communicate between any two or more circuit elements. At block 710, the data processing engine identifies a destination engine for the processed data. In other embodiments, the engine can identify multiple destination engines for the processed data as shown in FIG. 6. In one embodiment, the data may be destined for the SoC interface block which provides an interface between the array of data processing engines and other hardware elements in a SoC.

At block 715, the data processing engines determines whether the destination engine is a non-neighboring engine. In one embodiment, the engine has a direct communication interface to neighboring engines in the array (i.e., engines that are directly adjacent). For example, the engine may have share memory or have a core-to-core communication link with neighboring engines but not to non-neighboring engines.

If the destination engine is a non-neighboring engine, the method 700 proceeds to block 720 where the engine transmits the data to the destination engine or engines using the interconnect—e.g., a streaming network with reserved point-to-point communication paths in the case of circuit switching. That is, because the source engine does not have a direct communication interface to the destination engine, the default is to use the interconnect to communicate with the destination engine.

However, if the destination engine is a neighboring engine, the method 700 proceeds to block 725 to determine whether shared memory or a core-to-core communication link is available. For example, the shared memory may be full or reserved for other tasks. In another example, the core-to-core communication link may be used if the source engine and the destination engines execute two sub-tasks of the same task or kernel. In yet another example, these direct communication techniques may not have enough available bandwidth to transmit the data. If these techniques are not available, the method 700 proceeds to block 720 and uses the interconnect. However, if shared memory or the core-to-core communication link is available, the method 700 proceeds to block 730 where the source engine uses shared memory or the core-to-core communication link to transmit the data to the destination engine.

Dual Mode Interconnect

As mentioned above, in one embodiment, the interconnect 205 in the DPE 110 illustrated in FIG. 2 supports two different modes of operation: circuit switching mode and packet switching mode. Circuit switching relies on reserved point-to-point communication path between a source DPE 110 to one or more destination DPEs 110. In one embodiment, the point-to-point communication path used when performing circuit switching in the interconnect 205 is not shared with other streams (regardless whether those streams are circuit switched or packet switched). However, when transmitting data between two or more DPEs 110 using packet-switching, the same physical wires can be shared with other logical streams.

In one embodiment, the interconnect 205 described above includes input stream ports (slave ports) which receive data from interconnects 205 in neighboring DPEs 110 and output stream ports (master ports) which transmit data to the interconnects 205 in neighboring DPEs 110. In one embodiment, these stream ports are configured to perform circuit switching or packet switching, but not both at the same time. That is, at a first period of time, a first port in the interconnect 205 can be configured to perform circuit switching but later can be reconfigured to perform packet switching. The configuration of the streaming ports can be controlled by configuration registers corresponding to the ports. Moreover, the interconnect 205 can have a first port that performs circuit switching at the same time a second port performs packet switching.

Circuit Switching

For circuit switched streaming, a slave port (e.g., the port on the DPE which is transmitting the data) and a master port (e.g., the port on the DPE which receives the transmitted data) are configured to circuit switching by writing the same bit value into the corresponding configuration registers. For example, setting the bit value to '0' may configure the master and slave ports to perform circuit switching while a '0' configures the ports to perform packet switching. This configuration may occur when the SoC is being rebooted or powered on.

In one embodiment, circuit switching has one slave port and can have any number of destination or master ports. When the communication path has more than one destination (e.g., the example illustrated in FIG. 6), it can be referred to as a multicast stream. The data transmitted by the slave port is streamed to all the destinations/master ports in parallel.

As mentioned above, when performing circuit switching, the physical route used to form the point-to-point communication through interconnects 205 is not shared with other streams (whether those streams are other circuit switched streams or packet switched streams). Stated differently, for any stream port in the interconnects 205 through which a circuit switched logical stream passes through, those ports may not be used for any other logical stream. Because the routes are not shared, circuit switching can be described as deterministic. That is, the latency for each word transmitted in a circuit switched stream is deterministic, although there can be backpressure if the destination port is busy and cannot accept more data. That is, congestion in the interconnect does not affect circuit switching (i.e., they are independent) unless there is backpressure where a port is too busy to accept more data. Further, in one embodiment, the DPEs 110 do not support external interrupts when transmitting streaming data to help achieve deterministic performance and reduce latency. Also, this avoids using caches in the interconnect or the streaming interconnects and complex cache-coherency.

Figure 8:
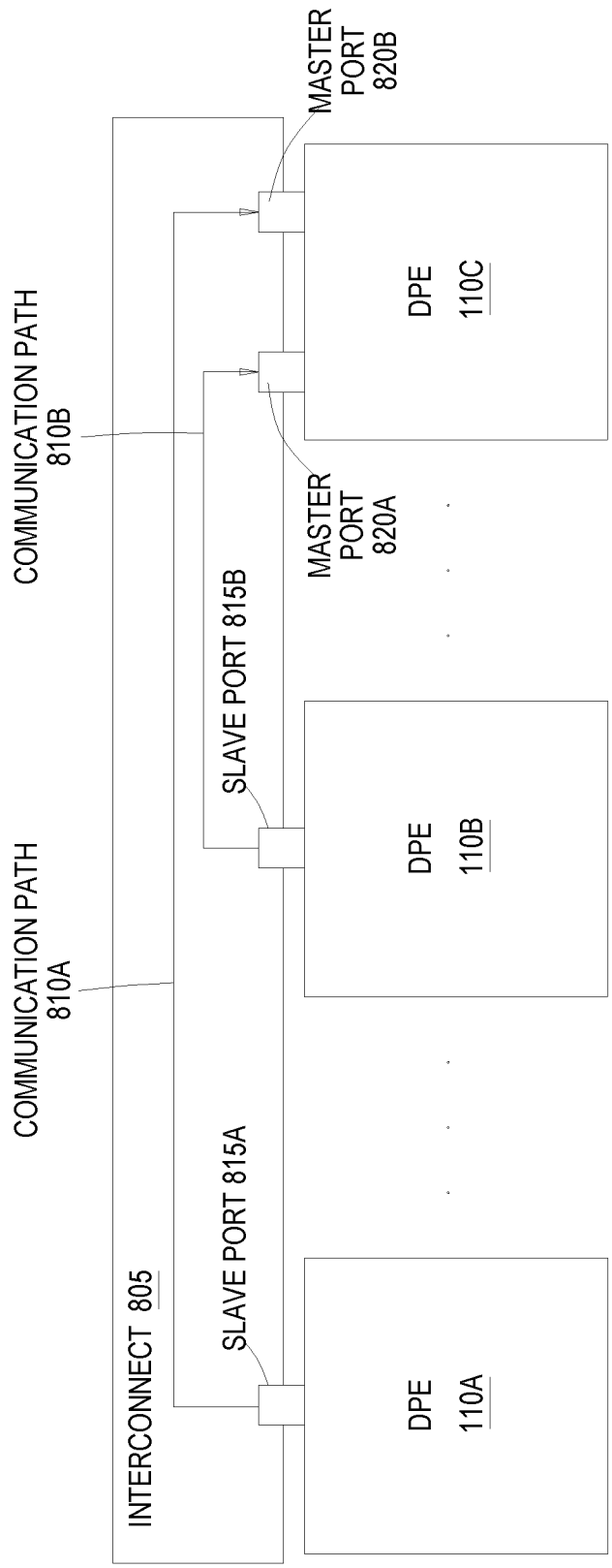
FIG. 8 illustrates multiple circuit switched streams, according to an example.

FIG. 8 illustrates multiple circuit switched streams, according to an example. As shown, the DPE 110A uses a dedicated stream (e.g., an AXI stream) shown by the communication path 810A to send data to the DPE 110C. The DPE 110B uses a separate dedicated stream shown by the communication path 810B to send data to the DPE 110C. The DPEs 110A and 110B can transmit data using the two communication paths 810A and 810B to the DPE 110C in parallel.

The interconnect 805 (which can include multiple interconnects coupled together) includes a slave port 815 for each of the DPEs 110A and 110B which those engines use to transmit streaming data to master ports 820 coupled to the DPE 110C. In one embodiment, each master port 820 includes a register which stores a value specifying the slave port 815 within the same streaming interconnect from which the data flows. Thus, while FIG. 8 illustrates the slave ports 815 and master ports 820 coupled to the DPEs 110, each streaming interconnect in the interconnect 805 may have a corresponding master port and slave port which forms the point-to-point communication paths 810. For example, if the communication path 810B between the DPE 110B and 110C only includes one streaming interconnect, then the master port 820B and the slave port 815A are both ports on that switch. That is, the DPE 110B transmits data to the streaming interconnect using the slave port 815B which then forwards data to the master port 820A and to the DPE 110C. In contrast, if the communication path 810A between the DPE 110A and the DPE 110C includes multiple streaming interconnects, each of those interconnects have a slave port 815 and master port 820 that are reserved for the communication path 810A (and thus, cannot be used by other logical streams). In this example, the slave port 815A would be on a first streaming interconnect in the communication path 810A which is coupled to the DPE 110A while the master port 820B is on the last streaming interconnect in the path 810A and is coupled to the DPE 110C. Between those streaming interconnects can be any number of other streaming interconnects that each have a slave port coupled to a master port in the upstream stream in the communication path 810A. That is, the streaming interconnects in the communication path 810A can be daisy chained by connecting the master port in the upstream streaming interconnect to the slave port in the downstream switch. Because each master port knows the slave port from which it receives data, the data can flow from the DPE 110A to the DPE 110C without any routing logic being performed on the streaming interconnects. Put differently, the streaming data flowing in the point-to-point communication paths 810A and 810B does not need any headers or addresses in order to reach the destination DPE 110C.

In one embodiment, any slave port 815 within a given streaming interconnect can be connected to any master port 820 within that same switch. This can be used for the communication path 610 shown in FIG. 6 where a slave port can transmit data to multiple master ports. For example, a slave port (not shown) coupled to the DPE 605D in FIG. 6 can transmit data to three different master ports in the same switch. The three master ports can then be coupled to three different slave ports on one or more downstream streaming interconnects, thereby establishing the communication path 205 to the three different DPEs 605B and 605E and 605F. That is, the data received from the DPE 605D can be split and transmitted to three different master ports in the same streaming interconnect to form three point-to-point communication paths to the DPEs 605B, 605E, and 605F. In one embodiment, the data is sent from the slave port to the multiple master ports at the same time and only when all of the master ports are ready to receive the data (i.e., there is no backpressure).

Packet Streaming

To perform packet streaming, the configuration registers corresponding to the slave and master ports in the streaming interconnects to be used are set to the packet switching value—e.g., a '1.' One distinction between packet switched streams and circuit switched streams is the ability of to share ports configured to perform packet switching. Because the ports can be shared between multiple logical streams, the physical wires coupled to those ports can also be shared. In general, packet-switched streams do not provide deterministic latency (i.e., are non-deterministic) due to potential resource contention with other packet-switched streams. That is, the latency can vary depending on congestion.

Like circuit switching, packet switching has reserved resources although the exact path the streaming data follows in the interconnect may not be predetermined. In one embodiment, a packet-switched stream is identified by an N-bit ID which is unique amongst all streams it shares ports with. This stream ID also identifies the destination of the packet, and thus, can be referred to as a destination ID.

A packet-switched stream can be regarded as the set of physical streams with an identical set of destination ports. In this context, a destination can be an arbitrary number of master ports, it does not have to be just a single master port. The set of destination ports for a given packet-switched stream is a function of the streaming interconnect configuration. Packet-switched streams make it possible to realize all combinations of single/multiple master/slave ports in any given stream.

Figure 9A:
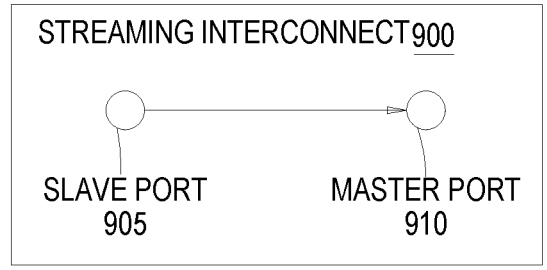
FIGS. 9A-9D illustrate different configurations of a streaming interconnect when performing packet switching, according to an example.

FIGS. 9A-9D illustrate different configurations of a streaming interconnect when performing packet switching, according to an example. FIG. 9A illustrates a streaming interconnect 900 with a slave port 905 communicating data to a master port 910. The slave port 905 can receive data from a master port in an upstream streaming interconnect, or a DMA engine or core in the same DPE as the streaming interconnect 900 which the streaming interconnect 900 then routes to the master port 910. Although not shown, the master port 910 can be coupled to a slave port in a downstream streaming interconnect. In this manner, packet switching can be used to transmit data from one slave port 905 to one master port 910.

Figure 9B:
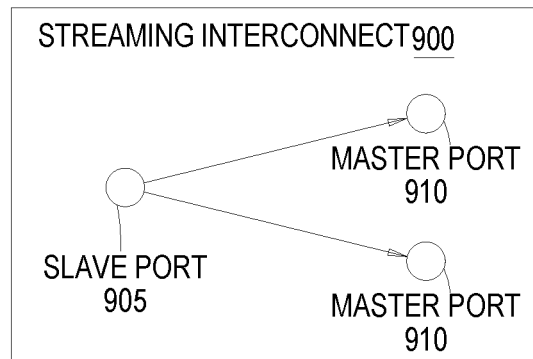

FIG. 9B illustrates a streaming interconnect 900 with a slave port 905 communicating data to two master ports 910. The slave port 905 can receive data from a master port in an upstream streaming interconnect or a DMA engine/core in the same DPE as the streaming interconnect 900 which the streaming interconnect 900 then routes to the two master ports 910. Although not shown, the two master ports 910 can be coupled to slave ports in one or more downstream streaming interconnects. Further, although the slave port 905 transmits data to two master ports 910 in FIG. 9B, the slave port 905 can transmit the data to any number of master ports 910 in the streaming interconnect 900. In this manner, packet switching can be used to transmit from one to many.

Figure 9C:
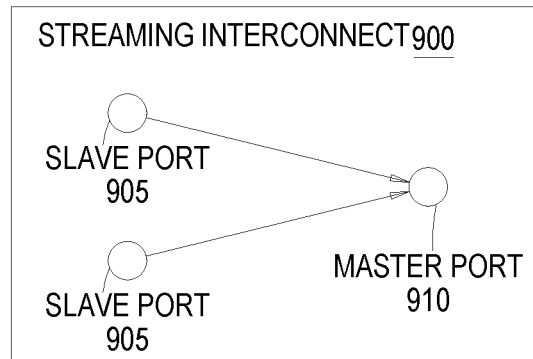

FIG. 9C illustrates a streaming interconnect 900 with two slave ports 905 communicating data to the same master port 910. That is, the streaming interconnect 900 can route the respective packet-switch streams received at the slave ports 905 to the same master port 910. To do so, the streaming interconnect 900 may include an arbiter (discussed below) that controls access to the master port 910 so that both slave ports 905 do not transmit data to the master port 910 at the same time. Put differently, the arbiter can time multiplex the streams flowing from the slave ports 905 to the master port 910. While FIG. 9C illustrates two slave ports 905, the streaming interconnect 900 could have any number of slave ports 905 transmitting data to the same master port 910 (so long as the slave ports 905 do not transmit data concurrently).

Figure 9D:
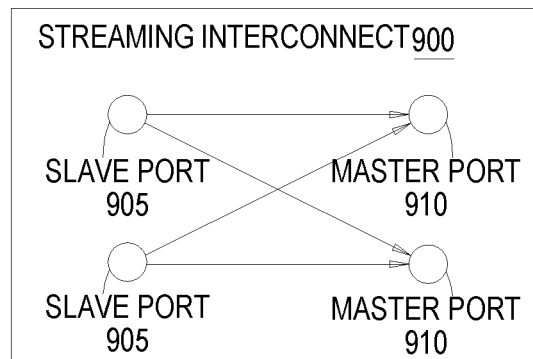

FIG. 9D illustrates a streaming interconnect 900 with two slave ports 905 communicating data to two master ports 910. That is, the streaming interconnect 900 can route the respective packet-switch streams received at the slave ports 905 to the either of the master ports 910. To do so, the streaming interconnect 900 may include an arbiter for each of the master ports 910 (e.g., each master port 910 has its own arbiter) that controls access to the master port 910 so that both slave ports 905 do not transmit data to the same master port 910 at the same time. Like in FIG. 9C, the arbiters can time multiplex the streams flowing from the slave ports 905 to the master ports 910. For example, one of the slave ports 905 can transmit data to one of the two master ports 910 at the same time the other slave port 905 transmits data to the other master port 910, but the arbiters prevent two of the slave ports 905 from transmitting data to the same master port 910 at the same time. While FIG. 9D illustrates two slave ports 905 and two master ports 910, the streaming interconnect 900 could have any number of slave ports 905 that can transmit data to any number of master ports 910. For example, the streaming interconnect 900 may have four slave ports 905 that can transmit streaming data to three master ports 910.

It should be noted that circuit switching can be used to transmit data between slave and master ports as shown in FIGS. 9A and 9B. That is, circuit switching can be used to establish streams between one slave port and one master port or between one slave port and multiple master ports. However, in one embodiment, circuit switching cannot be used to transmit data from multiple slaves to one or more masters. That is, as mentioned above, circuit switching may prevent a master port from receiving data from multiple slaves, but a slave port can transmit data to multiple master ports. As such, circuit switching may not be able to perform the communication schemes shown in FIGS. 9C and 9D.

FIG. 10 illustrates a header format 1000 for a packet switched packet, according to an example. The chart 1005 includes a bit field indicating the bits used to represent a particular field in the header format 1000. Generally, the header in the packets is a special data word with routing and control information for the packet. The packet header is followed by the actual data in the packet. The TLAST signal in the AXI-streaming protocol (which is a sideband signal) can be used to indicate the last word in the packet and to mark the end of the packet.

The header format 1000 includes bits for a stream ID, packet type, source row, source column, and parity bit. However, in other embodiments, the format 1000 may not include all of these fields, or may include additional fields. For example, the packet type field is not necessary and can be used to distinguish between different categories of streams such as data streams, trace streams (which report events or log errors), and control streams (which write/read memory mapped registers/memories using streaming interconnect and is not a memory mapped interconnect).

In one embodiment, the header format 1000 permits ports configured to perform packet switching to support multiple logical flows. That is, a communication path can be logically divided into different data flows between the DPEs which each have their own stream ID. For example, the streaming data in the communication path can have use the stream ID field in their headers to indicate which logical flow the data is assigned. For example, the DPEs at the ends of the point-to-point communication paths may execute different tasks which share information. Each of these tasks may be assigned to a different logic flow in the same communication path so that the data can be better managed when streaming through the interconnects.

The source row and columns fields indicate the location of the DPE that sourced the streaming data in the array. The parity bit field can be used to determine if an error is introduced into the data (e.g., a bit is flipped in the data) as the packet is transmitted between a source and destination in the interconnect.

The discussion below indicates how routing can incur within the streaming interconnects using the arbiters when performing packet switching. Within each AXI-Stream switch, assume there is a set of slave ports S (where s represents a particular one of the those slave ports S), a set of master ports M and a set of arbiters A. Further assume there is a range of packet IDs I and a range of master select (msel) values K.

For every s∈S let there be an arbiter select function $a_s$:

$$a_s: I \rightarrow A \quad (1)$$

For every s∈S let there be an msel function $b_s$:

$$b_s: I \rightarrow K \quad (2)$$

Let there be a mapping function (c) from master ports to arbiters:

$$c: M \rightarrow A \quad (3)$$

For every m∈M let there be masking function $d_m$:

$$d_m: K \rightarrow \{0,1\} \quad (4)$$

Let there be a routing function (ms) with the Cartesian product of slave ports and IDs as its domain and the power set of M as its codomain:

$$ms: S \times I \rightarrow \wp(M) \quad (5)$$

The routing function ms defines the packet-switched routing mechanism as it returns a set of master ports for any given slave port s∈S and stream ID i∈I. It is defined as follows:

$$ms(s,i) = \{m \in M | a_s(i) = c(m) \wedge d_m(b_s(i)) = 1\} \quad (6)$$

The first term of Equation 6 states that the arbiter select function $a_s$ of the master points to the same arbiter for a given ID as the arbiter assigned to the targeted master ports. The second term of Equation 6 states that the masking function $d_m$ of the targeted master ports should be true for the msel value given by the slave port and ID. This feature can be used to select a subset of masters from a set controlled by a common arbiter.

As shown in Equation 6, the routing function ms can be defined by the functions a, b, c, and d—e.g., the arbiter select function, msel function, the mapping function, and the masking function. The behavior of each of these functions is controlled by a set of control registers, either in the master or in the slave ports.

FIG. 11 is a flowchart for routing data using the control registers, according to one example. At block 1105, the streaming interconnect identifies an arbiter using the packet header in a stream. As described above, each slave port s∈S has an arbiter select function $a_s$ that maps every received stream ID to an arbiter and an msel function $b_s$ that maps every received stream ID to an msel value. For this purpose, each slave port has a programmable lookup table with entries that may contain the following information:

TABLE 1

| Name | Size | Description |
| --- | --- | --- |
| ID | X-bits | The ID to match with the ID from the header |
| ID_Mask | Y-bits | Which bits shall be included in the ID matching |
| Arbiter | Z-bits | Which arbiter to use if there is a match |
| Master Select | A-bits | What master select to use for this match (msel) |

Whenever a slave port receives a new packet header (after detecting the end of a previous packet), the streaming interconnect uses the ID specified in the packet header and compares it against the 'ID' field in each lookup entry of Table 1. For this comparison, all bits that are '0' in the 'ID Mask' field are ignored. The arbiter selected (and therefore the value of $a_s$) is taken from the 'Arbiter' field in the matching lookup table. If there are more than one matching lookups, the lowest matching entry takes priority.

At block 1110, the streaming interconnect selects a master select value using the packet header. The msel function $b_s$ behaves in exactly the same manner as the arbiter function, but this function instead returns the 'Master Select' field instead of the 'Arbiter' field, which identifies the master port.

At block 1115, the streaming interconnect identifies the arbiters corresponding to the selected master ports. This can be done by setting bits in the configuration registers corresponding to the master ports to specify one of the arbiters, which can be performed when the SoC is first powered one in order to map the arbiters to the master ports.

At block 1120, the streaming interconnect identifies a masking value for the selected master port. In one embodiment, each master port m∈M has a masking function $d_m$ mapping each value k∈K to the Boolean domain. For example, the architecture may have four possible msel values. To achieve this, each master port has four bits in its control register, each containing the return value of $d_m$ for the corresponding value of k. Here k is used as an index to select the kth bit.

At block 1125, the master port removes the header from the stream. Each master port can have a 'drop header' bit in its configuration register which, when asserted, causes the master port to strip the packet header from every passing data packet and only forward the remaining words. That is, in some situations, the master port removes the header before forwarding the streaming data to the next hop or to its destination, although this is not a requirement.

As mentioned above, arbitration may be used whenever multiple slave ports send data to the same master port. The arbiters ensure that only one slave port can write to a master port at any given point in time to prevent a collision. Whenever a slave port $s \in S$ receives a new packet header with stream ID $i \in I$, it sends a request to arbiter $a_s(i)$. The arbiter arbitrates between the slave ports transmitting requests to that arbiter in a fair and non-starving fashion. Concurrently, each master port sends a request for new arbitration to its arbiter (as per the mapping function c), when the master port receives the last word of a packet and a new arbitration has not occurred yet. At any given arbiter, a new arbitration occurs when there are multiple pending requests from slave ports and all masters that are mapped to the same arbiter are requesting a new arbitration.

In one embodiment, a stream that uses packet switching does not need to be configured as such in every streaming interconnect the stream passes through. It is possible and perhaps beneficial to configure ports for packet switching only when it is necessary. In many cases it might be possible to configure a particular connection in a streaming interconnect in the circuit switched mode, thereby saving the use of an arbiter which might be needed for an entirely different stream in that switch. For example, the streaming interconnects may include fewer numbers of arbiters than master ports (which reduces the complexity and size of the switches). As such, limiting the number of master ports configured to perform packet switching can mean more arbiters are available when a master port must be configured to perform packet switching.

The embodiments that follow describe non-limiting examples where packet switching may be more preferred over circuit switching.

Referring to FIG. 9B, it shows a single slave port 905 transmitting data to two master ports 910. This can be performed using either circuit switching or packet switching. However, packet switching may be used if more than one logical stream passes through the slave port 905 and each stream is intended to go to a different master port 910—not to both master ports 910 as in circuit switching. This scenario may appear in many wireless signal processing and machine learning applications.

There are at least two different ways to configure the streaming interconnect 900 to perform this function. A single arbiter configuration uses a single arbiter to route the data between the two masters. However, using a single arbiter means that the two master ports 910 may be unable to receive data in parallel from the slave port 905. Alternatively, a multiple arbiter configuration can be used which means the data streams to the two master ports 910 are independent in the sense that they can receive data in parallel from other slaves if required by the use case, but this configuration uses two rather than only one arbiter.

In another scenario illustrated by FIG. 9B, several logical streams pass through the same slave port while the sets of their intended master ports overlap but are not equal. That is, one stream may transmit data to both master ports 910 while the other stream flowing through the slave port 905 transmits data to only one of the master ports 910. This may be used when performing matrix multiplication or when executing a machine learning application.

Referring to FIG. 9C, it illustrates two slave ports 905 transmitting data to the same master port 910. For example, more than one logical stream may pass through the master port 910 and each stream originates from a different slave port 905. This scenario may appear when transmitting trace stream or low bandwidth stream from different sources to a common destination. This use case works both when the two streams transmitted by the slave ports 905 have the same ID or different IDs. If the two streams have the same ID, they cannot be distinguished after being forwarded by the master port 910 (at least not without employing nested headers). If the IDs are different, they could for example be split up again after being forwarded by the master port 910 to a subsequent streaming interconnect.

Figure 12:
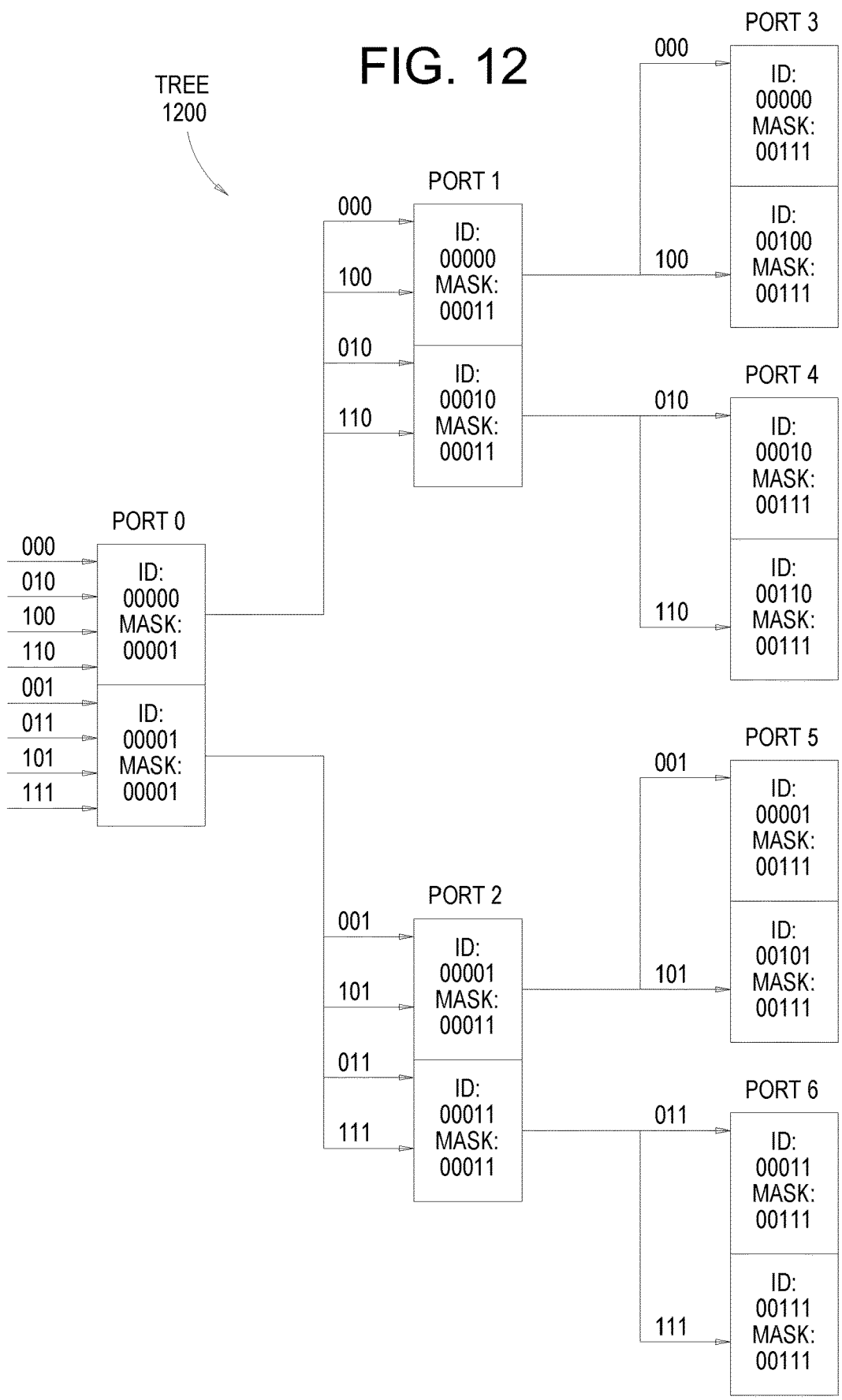
FIG. 12 illustrates a tree for masking values, according to one example.

In one embodiment, the number of logic streams that can be distinguished at a slave port depends on the number of look-up-table entries for each port. For example, each port may have only four entries. This means that without masking, only four logical streams can be distinguished at a given slave port. However, masking can be used to increase the number logical destinations. In order to achieve this, the stream network can be configured as a tree, where in each level the masking is reduced. For example, FIG. 12 illustrates eight distinct logical destinations ports or end points (arranged in a tree) which can be accessed through a single slave port, according to one example. To achieve 32 destinations (a full 5-bit ID range), the tree 1200 illustrated in FIG. 12 may be balanced, meaning every node evenly distributes the IDs among its children.

If more destinations are needed than can be provided by using the network structure shown in FIG. 12, nested headers can be used. A packet with nested headers has a number of headers at the beginning (instead of the usual single header). The streaming interconnect can then use masking in the tree 1200 to begin with.

Once the point is reached where nested headers do not work any longer, the final master ports are configured to drop the header via their control register. This opens up the entire ID range behind that master port and the whole process can be repeated. This means that for every level of header nesting, the number of possible destinations is multiplied by the maximum entries permitted by using the tree 1200 (e.g., 32). Thus, for a two-nested header approach, the number of destinations is already, e.g., 1024.

Figure 13:
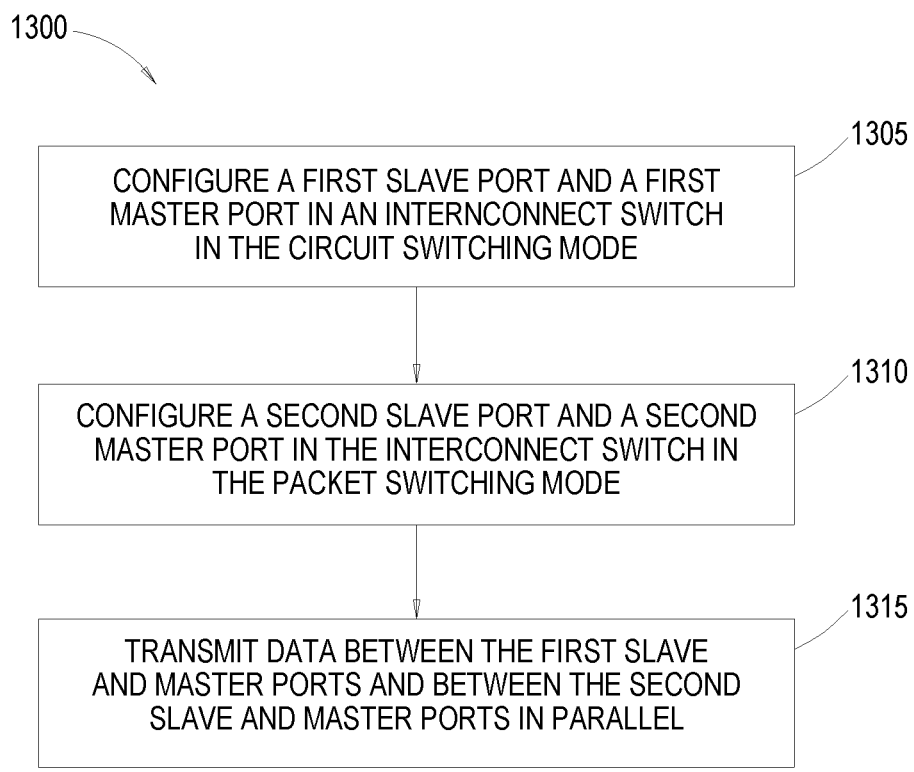
FIG. 13 is a flowchart for configuring the interconnect into dual modes, according to an example.

FIG. 13 is a flowchart of a method 1300 for configuring the interconnect into dual modes, according to an example. At block 1305, a configuration application (e.g., a software tool) configures a first slave port and a first master port in a streaming interconnect in the circuit switching mode. In one embodiment, the configuration application may use various hardware systems in the SoC to update configuration registers which set bits indicating the first slave and master ports are in the circuit switching mode.

At block 1310, the configuration application configures a second slave port and a second master port in the streaming interconnect in the packet switching mode. In one embodiment, the configuration registers for the second slave and master ports are set to indicate these ports are in the packet switching mode (which is a different bit value from the first slave and master ports). In this manner, different ports in the same streaming interconnect can be configured in two different modes. That is, some of the ports in the streaming interconnect can perform circuit switching while other ports perform packet switching. In one embodiment, a port can be configured only to perform circuit switching or packet switching, but not both. However, the streaming interconnect can be reconfigured at a later time to switch the ports to a different mode from their previous mode. For example, the first slave and master ports can be switched to the packet switching mode while the second slave and master ports are switched to the circuit switching mode.

At block 1315, the first slave port transmits data to the first master port in parallel with the second slave port transmitting data to the second master port. That is, the streaming data transmitted between the first slave and master ports is a circuit switched stream while the streaming data transmitted between the second slave and master ports is a packet switched stream. Thus, the streaming interconnect can permit streaming data routed by both modes to flow through it at the same time, although this is not a requirement. Although FIG. 13 discusses transmitting data using the dual mode interconnect between two DPEs, the embodiments herein are not limited to such and instead the dual mode interconnect can be used to communicate between any two or more circuit elements.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method, comprising:
   processing data in a first data processing engine in an array of data processing engines disposed in an integrated circuit, wherein each of the data processing engines are coupled together using an interconnect, wherein each of the data processing engines comprise at least one streaming interconnect configured to form the interconnect;
   identifying a second data processing engine of the data processing engines as a destination for the processed data;
   determining whether the second data processing engine neighbors the first data processing engine in the array and has a direct communication path to the first data processing engine; and
   upon determining the second data processing engine does not have a direct communication link to the first data processing engine, transmitting the processed data to the second data processing engine using a reserved point-to-point communication path through a plurality of the streaming interconnects in the interconnect, wherein the point-to-point communication path couples the first data processing engine to the second data processing engine.

2. The method of claim 1, further comprising:
   establishing the reserved point-to-point communication path in the interconnect before data is transmitted from the first data processing engine to the second data processing engine, wherein the reserved point-to-point communication path is a streaming data path.

3. The method of claim 2, wherein the reserved point-to-point communication path is an Advanced Extensible Interface (AXI) streaming data path.

4. The method of claim 1, wherein the streaming interconnect in the first data processing engine is communicatively coupled to one or more streaming interconnects in neighboring data processing engines in a same row and a same column as the first data processing engine in the array.

5. The method of claim 1, wherein each of the data processing engines comprises a core and a memory module, wherein at least one of the core and a direct memory access (DMA) engine in the memory module is coupled to the streaming interconnect in each of the data processing engines.

6. The method of claim 1, wherein each of the streaming interconnects comprises a buffer for handling jitter when transmitting the processed data, wherein the reserved point-to-point communication path is deterministic.

7. The method of claim 1, wherein transmitting the processed data to the second data processing engine comprises:
   transmitting the processed data from a core in the first data processing engine to a memory module in the first data processing engine;
   transmitting the processed data from a DMA engine in the first data processing engine to the reserved point-to-point communication path;
   receiving the processed data from the reserved point-to-point communication path at a DMA engine in the second data processing engine; and
   forwarding the processed data from the DMA engine to a core in the second data processing engine.

8. The method of claim 1, wherein transmitting the processed data to the second data processing engine comprises:
   transmitting the processed data from a core in the first data processing engine to a memory module in the first data processing engine;
   transmitting the processed data from a DMA engine in the first data processing engine to the reserved point-to-point communication path; and
   receiving the processed data from the reserved point-to-point communication path at a core in the second data processing engine, wherein the reserved point-to-point communication path is directly coupled to the core in the second data processing engine.

9. The method of claim 1, further comprising:
   identifying a third data processing engine of the data processing engines as a destination for the processed data; and
   transmitting the processed data to the third data processing engine using a different reserved point-to-point communication path in the interconnect in parallel with transmitting the processed data to the second data processing engine.

10. The method of claim 9, further comprising:
    synchronizing transmitting the processed data to the second and third data processing engine such that the processed data is sent on the respective reserved point-to-point communication paths only when both the second and third data processing engines are ready.

11. The method of claim 1, wherein the direct communication path bypasses the interconnect and comprises at least one of a core-to-core communication link and a shared memory.

12. The method of claim 1, wherein the integrated circuit comprises a network on a chip (NoC), wherein the array of data processing engines is external to the NoC.

13. A system on a chip (SoC), comprising:
a first data processing engine in an array of data processing engines;
a second data processing engine in the array of data processing engines;
an interconnect communicatively coupling the first and second data processing engines, wherein the interconnect comprises a streaming interconnect disposed in each of the data processing engines, wherein the first data processing engine is configured to:
identify the second data processing engine as a destination for data processed by the first data processing engine;
determine whether the second data processing engine neighbors the first data processing engine in the array and has a direct communication path to the first data processing engine; and
upon determining the second data processing engine does not have a direct communication link to the first data processing engine, transmit the processed data to the second data processing engine using a reserved point-to-point communication path in the interconnect, wherein the point-to-point communication path couples the first data processing engine to the second data processing engine.

14. The SoC of claim 13, wherein the reserved point-to-point communication path in the interconnect is established before data is transmitted from the first data processing engine to the second data processing engine, wherein the reserved point-to-point communication path is a streaming data path.

15. The SoC of claim 13, wherein the streaming interconnect in the first data processing engine is communicatively coupled to one or more streaming interconnects in neighboring data processing engines in a same row and a same column as the first data processing engine in the array.

16. The SoC of claim 15, wherein each of the data processing engines comprises a core and a memory module, wherein at least one of the core and a DMA engine in the memory module is coupled to the streaming interconnect in each of the data processing engines.

17. The SoC of claim 13, wherein, when transmitting the processed data to the second data processing engine, the first data processing engine is configured to:
transmit the processed data from a core in the first data processing engine to a memory module in the first data processing engine; and
transmit the processed data from a DMA engine in the first data processing engine to the reserved point-to-point communication path,
wherein the second data processing engine is configured to:
receive the processed data from the reserved point-to-point communication path at a DMA engine in the second data processing engine; and forward the processed data from the DMA engine to a core in the second data processing engine.

18. The SoC of claim 13, wherein, when transmitting the processed data to the second data processing engine, the first data processing engine is configured to:
transmit the processed data from a core in the first data processing engine to a memory module in the first data processing engine; and
transmit the processed data from a DMA engine in the first data processing engine to the reserved point-to-point communication path,
wherein the second data processing engine is configured to:
receive the processed data from the reserved point-to-point communication path at a core in the second data processing engine, wherein the reserved point-to-point communication path is directly coupled to the core in the second data processing engine.

19. The SoC of claim 13, wherein the first data processing engine is configured to:
identify a third data processing engine of the data processing engines as a destination for the processed data; and
transmit the processed data to the third data processing engine using a different reserved point-to-point communication path in the interconnect in parallel with transmitting the processed data to the second data processing engine.

20. The SoC of claim 13, wherein the direct communication path, is separate from and bypasses the interconnect and comprises at least one of a core-to-core communication link and a shared memory.

* * * * *